United States Patent
Watson

(10) Patent No.: US 7,087,550 B2
(45) Date of Patent: *Aug. 8, 2006

(54) COMBINATION OF A GUARD BED AND A CATALYST BED

(75) Inventor: Michael John Watson, Cleveland (GB)

(73) Assignee: Johnson Matthey PLC, London (GB)

( * ) Notice: Subject to any disclaimer, the term of this patent is extended or adjusted under 35 U.S.C. 154(b) by 218 days.

This patent is subject to a terminal disclaimer.

(21) Appl. No.: 10/468,380

(22) PCT Filed: Jan. 22, 2002

(86) PCT No.: PCT/GB02/00243

§ 371 (c)(1),
(2), (4) Date: Aug. 19, 2003

(87) PCT Pub. No.: WO02/066156

PCT Pub. Date: Aug. 29, 2002

(65) Prior Publication Data

US 2004/0072682 A1  Apr. 15, 2004

(30) Foreign Application Priority Data

Feb. 20, 2001  (GB) .................... 0104096.3

(51) Int. Cl.
*B01J 21/18* (2006.01)
*B01J 35/02* (2006.01)
*C01B 21/38* (2006.01)
*B22F 1/00* (2006.01)
*B32B 15/02* (2006.01)

(52) U.S. Cl. .............. 502/174; 502/345; 502/349; 423/392; 423/652; 75/252; 75/255; 428/402; 422/211; 422/222

(58) Field of Classification Search ............ 502/174, 502/345, 349; 423/392, 652; 75/252, 255; 428/402; 422/211, 222, 392, 652
See application file for complete search history.

(56) References Cited

U.S. PATENT DOCUMENTS

| 4,849,577 A | | 7/1989 | Boitiaux et al. | |
| 6,068,824 A | * | 5/2000 | Kinoshita et al. | 423/239.1 |
| 2004/0170553 A1 | * | 9/2004 | Axon et al. | 423/392 |
| 2004/0234433 A1 | * | 11/2004 | Axon et al. | 422/211 |
| 2004/0253176 A1 | * | 12/2004 | Ward et al. | 423/652 |

FOREIGN PATENT DOCUMENTS

| GB | 1 357 335 | * | 6/1974 |
| WO | WO-01/17674 A1 | | 3/2001 |

OTHER PUBLICATIONS

International Search Report from International Application No. PCT/GB02/00243, dated May 28, 2002.

* cited by examiner

*Primary Examiner*—J. A. Lorengo
*Assistant Examiner*—Patricia L. Hailey
(74) *Attorney, Agent, or Firm*—RatnerPrestia

(57) ABSTRACT

A combination comprising a bed of a particulate copper-containing catalyst bed, a guard bed in the form of shaped units formed from lead carbonate and/or basic lead carbonate particles having an average (by volume) particle size below 100 μm.

11 Claims, No Drawings

COMBINATION OF A GUARD BED AND A CATALYST BED

This is a U.S. national phase application of International Application No. PCT/GB02/00243.

This invention relates to catalysts and in particular to copper catalysts.

Copper catalysts are often employed for reactions involving hydrogen, for example simple hydrogenation reactions, e.g. the hydrogenation of aldehydes to alcohols, for methanol synthesis (where carbon oxides are reacted with hydrogen), methanol decomposition (where methanol, often in admixture with steam, is decomposed to form hydrogen and carbon oxides) and the shift reaction (where carbon monoxide is reacted with steam to produce hydrogen and carbon dioxide) and the reverse shift reaction. Often, in order to obtain the optimum activity and stability of the catalyst, the catalyst is made with the copper in a highly dispersed form, for example by precipitation of a copper compound in the presence of, or together with, one or more support materials, especially zinc, magnesium, chromium and/or aluminium compounds. Following such precipitation, the composition is heated to convert the copper compounds, and, if necessary also support materials, to the corresponding oxides. Prior to use for the desired reaction, the copper oxide is reduced to metallic copper. Particularly suitable catalysts for the above reactions are copper/zinc oxide/alumina and copper/zinc oxide/chromia compositions. In some cases part of the zinc may be replaced by magnesium and/or part of the alumina or chromia may be replaced by ceria or a rare earth such as lanthana.

The copper catalysts are readily de-activated by the presence of chlorine compounds, such as hydrogen chloride, in the process gas undergoing the reaction. Traces of such chlorine compounds may arise from contaminants in the materials, for example hydrocarbon feedstock, steam, or air employed to make the process gas. Such chlorine compounds react with the active copper, forming copper chloride. Since copper chloride is relatively low melting, at the temperatures at which the catalysts are commonly employed, e.g. 150–300° C., the copper is mobilised and tends to aggregate resulting in a loss of dispersion of the copper and consequent loss of activity of the catalyst Also where zinc and/or magnesium oxide is a component of the catalyst, likewise the corresponding chlorides may be formed, and these likewise are liable to be mobilised resulting in loss of the stabilising effect of the zinc or magnesium oxides, again with the consequent loss of dispersion and activity of the copper.

It has been proposed in our co-pending PCT application WO 01/17674 to employ a guard bed upstream of the copper catalyst wherein the guard bed is a particulate composition containing a lead compound and a support therefor. That application discloses that the guard bed particles may be made by impregnating particles of the support with a solution of a suitable lead salt, for example lead nitrate, by precipitating an appropriate lead compound in the presence of particles of the support material, or by co-precipitating a lead compound and the support, or a precursor to the support. The preferred lead compound was lead nitrate. However, there is a risk when using lead nitrate that, in the event of a plant upset, water may condense on the guard bed and leach the lead nitrate from the support and wash it on to the downstream copper catalyst. Lead compounds tend to poison copper catalysts and so there is the risk that the activity of the copper catalysts may be diminished. For this reason it may be preferable to use a lead compound that is not soluble in water. While lead oxide is insoluble, we have found that it is not very effective as a chloride guard under some process conditions. However we have found that lead carbonate and basic lead carbonate are effective chloride guards. While the aforementioned PCT application suggested that lead carbonate or basic lead carbonate could be employed, it did not specifically disclose the production of guard beds containing such lead compounds.

We have found that shaped units suitable for use as guard beds can be made simply from finely divided lead carbonate and/or basic lead carbonate.

Accordingly the present invention provides a combination comprising a bed of a particulate copper-containing catalyst and, upstream of the catalyst bed, a guard bed of shaped units formed from lead carbonate and/or basic lead carbonate particles having an average (by weight) particle size below 100 µm. Particularly the lead carbonate and/or basic lead carbonate particles have an average (by weight) particle size below below 50 µm and preferably substantially all the particles have a size below 120 µm.

The guard bed is in the form of shaped units: these preferably have maximum and minimum dimensions in the range 1.5 to 20 mm, particularly 3 to 6 mm. The aspect ratio of the shaped units, i.e. the ratio of the maximum to minimum dimensions, is preferably less than 2.

The shaped units may be of regular shape, e.g. spheres, cylinders etc. and may be made by a "dry" technique wherein a powder composition is compacted to the desired shape, in e.g. a pelleting machine, or a "wet" method wherein a powder composition is mixed with a suitable liquid to form a paste which is then extruded to the desired cross section and the extrudate is cut or broken into units of the requisite length. A granulation method may alternatively be employed wherein a powder composition is mixed with a small amount of liquid, often water, insufficient to give a paste, and the resulting damp mixture granulated or pelletised by means of a pellet mill, for example of the type used for pelleting animal feedstuffs, wherein the mixture to be pelleted is charged to a rotating perforate cylinder through the perforations of which the mixture is forced by a bar or roller within the cylinder. The resulting extruded mixture is cut from the surface of the rotating cylinder by a doctor knife positioned to give pellets of the desired length.

Where a "wet" shaping technique is employed, the shaped units are preferably dried before use.

The shaped units are preferably formed from a mixture of the lead carbonate and/or basic lead carbonate particles and finely divided support particles of an inert material such as alumina, a hydrated alumina, chromia, zirconia, titania, or, less preferably, silica. Alumina, or hydrated alumina, is the preferred support.

Whichever shaping method is used to form the shaped units, a processing aid such as a lubricant and/or a binder is preferably incorporated into the powder composition. Lubricants, which are generally employed when a "dry" processing route such as pelleting is used include graphite, fatty acids and salts thereof such as stearates. Binders that may be used may be inorganic, for example a clay, e.g. attapulgite, bentonite, sepiolite or colloidal magnesium aluminium silicate, or a cement, e.g. a calcium aluminate cement, or organic, e.g. a soluble carbohydrate such as starch, alginate or xanthan gum; a cellulose ether, e.g. hydroxy methyl cellulose; a protein; a polyvinyl alcohol, ester, acetal, or ether or mixed derivative e.g. a partially hydrolysed polyvinyl acetate; a polyalkylene oxide; a polyacrylate or methacrylate; or polyacrylamide or polymethacrylamide. Organic binders are preferred. The amount of binder employed is generally 0.5 to 10%, particularly 1 to 5%, by weight, based upon the combined weights of the lead compound, support (if any), and binder.

Preferred compositions, containing a binder and a support, have a lead content of 5 to 75%, particularly 10 to 60%, by weight of lead (expressed as metal) and based upon the combined weights of the lead compound, support, and binder.

If an organic binder is used, then irrespective of whether a wet or dry shaping method is employed, the shaped units are preferably calcined in air to burn out the binder. The calcination temperature is preferably in the range 200 to 400° C., preferably below the decomposition temperature of the lead compound. Preferably the guard bed material has a BET surface area greater than 50 $m^2/g$ and most preferably greater than 125 $m^2/g$. We have found that the calcination process may increase the surface area of the guard bed material. For example, absorbents made from basic lead carbonate and alumina trihydrate and calcined at 300° C. typically have a BET surface area of approximately 150 $m^2/g$.

The guard bed and the catalyst bed are used as fixed beds and may be in the same vessel or in different vessels, with the guard bed upstream of the catalyst bed. Preferably the process gas flows down through the catalyst bed: thus where the guard and catalyst beds are in the same vessel, the guard bed may be a layer of the guard bed particles on top of the catalyst bed particles. If desired there may be a layer of an inert material between the guard bed and the catalyst bed to facilitate replenishment of the guard bed without disturbing the catalyst bed.

Therefore according to a further aspect of the invention we provide a process for performing a catalytic reaction using a bed of a copper-containing catalyst, comprising passing a process gas through a guard bed of shaped units formed from lead carbonate and/or basic lead carbonate particles having an average (by weight) particle size below 100 μm and then passing said process gas through the bed of copper-containing catalyst.

The invention is of particular utility in relation to the shift reaction. In this process a process gas stream containing carbon monoxide and steam, and often other components such as hydrogen, carbon dioxide, methane, and/or nitrogen, is passed through a bed of the copper-containing catalyst, especially a copper/zinc oxide/alumina or copper/zinc oxide/chromia catalyst in which some of the zinc oxide may be replaced by magnesia and/or some of the alumina and/or chromia may be replaced by a rare earth, at a temperature in the range 150 to 300° C., especially at an inlet temperature in the range 150 to 250° C. The process gas preferably contains 1 to 4% by volume of carbon monoxide, and at least one mole of steam per mole of carbon monoxide. Preferably the process gas contains 20 to 50% by volume of steam. Typically the process is operated at a wet gas space velocity in the range 2000 to 5000 $h^{-1}$, and at pressures ranging from atmospheric to 50 bar abs.

In addition to absorbing chloride, it will be appreciated that the lead species will also absorb sulphur compounds and so the bed will also act as a sulphur guard bed.

The invention is illustrated by the following examples in which various guard beds were tested by charging 0.5 g (about 0.4 ml) of particles of a standard copper oxide/zinc oxide/alumina low temperature shift catalyst precursor containing about 50% by weight of copper oxide and having a particle size in the range 0.6–1.0 mm to a microreactor with 0.25 g (about 0.1 ml) of particles of fused alumina of particle size 0.6–1.0 mm disposed as a layer on top of the shift catalyst precursor and 0.2 ml (about 0.36 g) of the guard material particles of particle size 0.6–1.0 mm on top of the fused alumina particles to give a total catalyst bed of volume of about 0.70 ml.

The copper oxide in the catalyst precursor was reduced to metallic copper by passing a stream of nitrogen containing 2% by volume of hydrogen down through the microreactor at a pressure of about 28 bar abs. at a flow rate of 15 litres/hour (at NTP) while the microreactor was heated from ambient temperature to 220° C. and held at this temperature for 95 minutes to give a total reduction time of 3.5 hours.

The catalyst activity for the water gas shift reaction was determined by passing 50 litres/hour (at NTP) of a gas mixture comprising 1 part by volume of steam to 2 parts by volume of a gas of volume composition $H_2$ 55%, $CO_2$ 15%, CO 5%, and $N_2$ 25% through the microreactor at a temperature of 220° C. and a pressure of about 28 bar abs.

To simulate chloride contamination, after the gas mixture had been passed through the catalyst bed for about 6 hours, HCl was added to the gas mixture to give an HCl concentration in the wet gas of 1 ppm by volume. Under these fixed test conditions, the variation of CO conversion with time on line was measured using in-line infra-red detection. A decrease in CO conversion with time is indicative of loss of activity of the catalyst.

EXAMPLE 1

In this example a chloride absorbent is made from lead carbonate and alumina trihydrate powders. The lead carbonate powder had a weight average particle size of 4.5 μm with essentially all of the particles having a size in the range 1 to 60 μm. The alumina trihydrate powder had a BET surface area of 0.5 $m^2/g$ and a weight average particle size of 22 μm with essentially all of the particles having a size in the range 1 to 100 μm.

94 g of the alumina trihydrate powder was mixed for 5 min with 6 g of the lead carbonate powder and 2 g of graphite as a lubricant and the mixture formed into squat cylindrical pellets of 3 mm diameter and 0.6 mm height using a pelleting machine. The pellets had a nominal lead content of 4.6% by weight and a density of 2.3 g/ml.

EXAMPLE 2

Example 1 was repeated using 88 g of the alumina trihydrate powder and 12 g of the lead carbonate powder to give pellets having a nominal lead content of 9.1% by weight and density 2.5 g/ml.

EXAMPLE 3

Example 1 was repeated using 80 g of the alumina trihydrate powder and 24 g of the lead carbonate powder to give pellets having a nominal lead content of 17.6% by weight and a density of 2.5 g/ml.

EXAMPLE 4

Example 1 was repeated using 60 g of the alumina trihydrate powder and 48 g of the lead carbonate powder to give pellets having a nominal lead content of 33.8% by weight and a density of 2.9 g/ml.

EXAMPLE 5 (COMPARATIVE)

For purposes of comparison a commercially available absorbent comprising lead oxide on alumina having a nominal lead content of about 20.5% by weight was employed.

The materials of Examples 1 to 5 were tested as described above: prior to use the pellets were broken down to particles of size 0.6–1 mm. Since the material of Example 5 had a significantly lower bulk density than the materials of Examples 1–4, in this case a similar volume (about 0.2 ml) of absorbent was used but its weight was only about 0.19 g.

The % CO conversion was determined for a period of several days with measurements being taken at regular intervals. To assist comparison, the CO conversion measurements were plotted against time-on-line and a smooth curve drawn through the points for each sample. (The individual points showed little variance from the smooth curves). From these plots, the conversion every 24 hours was determined and the results are shown in the following Table 1 wherein the % CO conversion figures have been rounded to the nearest integer.

TABLE 1

| Time on line | CO Conversion (%) | | | | |
|---|---|---|---|---|---|
| (days) | Ex 1 | Ex 2 | Ex 3 | Ex 4 | Ex 5 |
| 1 | 86 | 84 | 86 | 85 | 85 |
| 2 | 82 | 82 | 84 | 83 | 81 |
| 3 | 68 | 78 | 83 | 81 | 72 |
| 4 | 40 | 65 | 80 | 80 | 50 |
| 5 | 0 | 42 | 75 | 79 | 7 |
| 6 | | | 64 | 78 | 0 |
| 7 | | | 45 | 77 | |
| 8 | | | 8 | 76 | |
| 9 | | | 0 | 75 | |
| 10 | | | | 73 | |

EXAMPLE 6

360 g of the alumina trihydrate powder as used in Example 1 was mixed for 5 min with 287.4 g of the lead carbonate powder as used in Example 1 to give a powder mixture having a nominal lead content of 34.4% by weight. The powder mixture was then dried for 2 hours in an oven at 110° C. and then divided into four parts. One portion was pelleted as described in Example 1 with the addition of 2% by weight of graphite as a lubricant. The other portions were calcined for 2 hours at various temperatures before addition of 2% by weight of graphite and pelleting as described above. In each case the pellets had a density of about 2.9 g/ml. The weight loss on calcination was also determined. The materials were tested as described above and the results are shown in the following Table 2.

TABLE 2

| | CO Conversion (%) | | | |
|---|---|---|---|---|
| Time on line (days) | No calcination | Calcined at 200° C. | Calcined at 300° C. | Calcined at 400° C. |
| 1 | 82 | 85 | 86 | 85 |
| 2 | 79 | 82 | 84 | 83 |
| 3 | 76 | 80 | 83 | 82 |
| 4 | 75 | 79 | 82 | 80 |
| 5 | 74 | 78 | 80 | 79 |
| 6 | 72 | 76 | 78 | 78 |
| 7 | 71 | 75 | 76 | 77 |

TABLE 2-continued

| | CO Conversion (%) | | | |
|---|---|---|---|---|
| Time on line (days) | No calcination | Calcined at 200° C. | Calcined at 300° C. | Calcined at 400° C. |
| 8 | 70 | 74 | 70 | 74 |
| 9 | 64 | 71 | 58 | 68 |
| 10 | 55 | 65 | 40 | 56 |
| Weightloss(%) | — | 2.4 | 16.7 | 21.6 |

EXAMPLE 7

In this example, absorbents are made from basic lead carbonate and alumina trihydrate. The alumina trihydrate was the same as that used in Examples 1 to 4. Over 99.5% by weight of the particles of basic lead carbonate had a size below 63 μm.

47.9 g of the basic lead carbonate powder and 60 g of the alumina trihydrate powder were mixed to give a powder mixture having a nominal lead content of 35.6%. The powder mixture was then dried for 2 hours in an oven at 110° C. and then divided into three parts. One portion was pelleted as described in Example 1 with the addition of 2% by weight of graphite as a lubricant. The other portions were calcined for 2 hours at various temperatures before addition of 2% by weight of graphite and pelleting as described above. In each case the pellets had a density of about 2.7 g/ml except for the sample prepared using a calcination temperature of 200° C. were the pellets had a density of 2.9 g/ml.

The materials were tested as described above and the results are shown in Table 3.

TABLE 3

| | CO Conversion (%) | | | |
|---|---|---|---|---|
| Time on line (days) | Undried | Dried at 110° C. | Calcined at 200° C. | Calcined at 300° C. |
| 1 | 79 | 80 | 81 | 86 |
| 2 | 72 | 73 | 74 | 84 |
| 3 | 70 | 70 | 72 | 83 |
| 4 | 70 | 70 | 72 | 82 |
| 5 | 70 | 70 | 72 | 80 |
| 6 | 70 | 70 | 72 | 79 |
| 7 | 59 | 70 | 72 | 77 |
| 8 | 27 | 60 | 53 | 72 |
| 9 | 2 | 25 | 10 | 48 |
| 10 | — | 4 | 0 | 10 |

The invention claimed is:

1. A combination comprising a bed of a particulate copper-containing catalyst and, upstream of the catalyst bed, a guard bed of shaped units formed from lead carbonate and/or basic lead carbonate particles having an average (by weight) particle size below 100 μm.

2. A combination according to claim 1 wherein the shaped units are formed from a composition containing a processing aid.

3. A combination according to claim 2 wherein the processing aid comprises a binder.

4. A combination according to claim 1 wherein the shaped units are formed from a composition containing particles of a support selected from alumina, hydrated alumina, chromia, zirconia, and titania.

5. A combination according to claim 4 wherein the shaped units are formed from a composition containing a binder and have a lead content of 5 to 75%, by weight of lead (expressed as metal) based upon the combined weights of the lead compound, support, and binder.

6. A combination according to claim 1 wherein the lead carbonate or basic lead carbonate used to form the shaped units has an average (by weight) particle size below 50 μm.

7. A combination according to claim 3 wherein the shaped units are made from a composition containing 1 to 5%, by weight of the binder, based upon the combined weights of the lead compound, support (if any), and binder.

8. A combination according to claim 1 wherein the shaped units have maximum and minimum dimensions in the range 1.5 to 20 mm.

9. A combination according to claim 1 wherein the shaped units have an aspect ratio of less than 2.

10. A combination according to claim 1 wherein the shaped units have been calcined at a temperature above 200° C. but below the decomposition temperature of the lead compound.

11. A process for performing a catalytic shift reaction using a bed of a copper-containing catalyst comprising passing a process gas comprising carbon monoxide and steam through a guard bed of shaped units formed from lead carbonate and/or basic lead carbonate particles having an average (by weight) particle size below 100 μm and then passing said process gas through the bed of copper-containing catalyst at a temperature in the range 150 to 300° C.

* * * * *